J. W. BEMENT.
LUGGAGE RACK.
APPLICATION FILED OCT. 5, 1918.
1,381,961. Patented June 21, 1921.
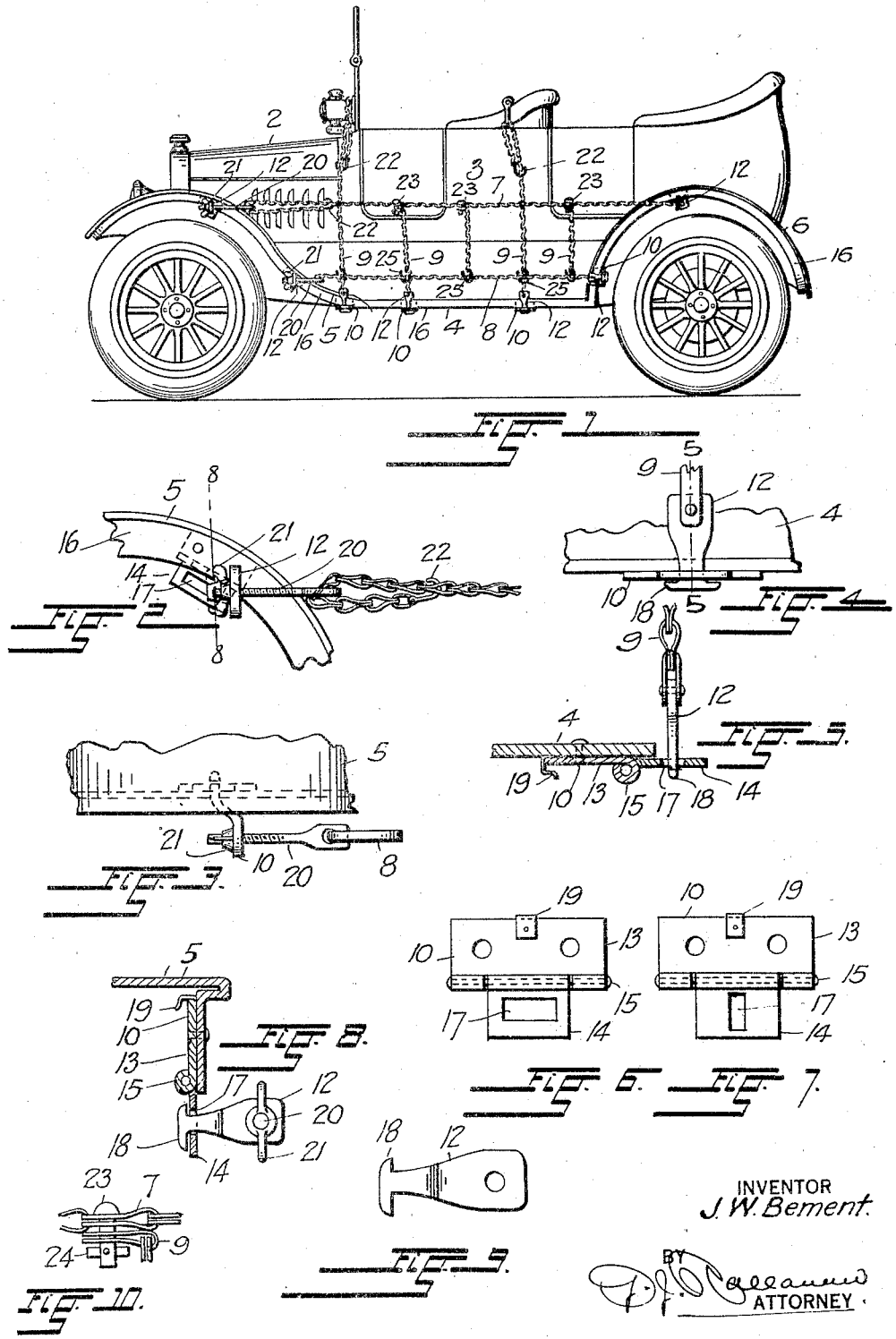

UNITED STATES PATENT OFFICE.

JOHN W. BEMENT, OF DENVER, COLORADO.

LUGGAGE-RACK.

1,381,961.   Specification of Letters Patent.   Patented June 21, 1921.

Application filed October 5, 1918. Serial No. 257,022.

*To all whom it may concern:*

Be it known that I, JOHN W. BEMENT, a citizen of the United States, residing at Denver, in the county of Denver and State of Colorado, have invented certain new and useful Improvements in Luggage-Racks, of which the following is a specification.

This invention relates to luggage racks for automobiles, and its object is to provide an appliance of very simple construction which in connection with the running-board and mud-guards of an automobile of modern construction provides a roomy and safe receptacle for the storage of suit-cases, clothing, bedding and other articles carried by campers, tourists and hunters.

Other objects of my invention reside in providing an appliance of the character above referred to, which is light and inexpensive, which may be bunched for storage in a tool-chest or other place of small dimensions, and which is readily adjustable to vary the capacity of the receptacle produced by its use.

Still further objects of the invention are found in the provision of simple coöperative devices of novel construction for the attachment of the appliance to the running-board and mud-guards of a motor vehicle.

With the above and other objects in view, all of which will fully appear in the course of the following description, my invention consists in the constructions and combination of parts shown in the accompanying drawings in the various views of which like parts are similarly designated, and in which—

Figure 1 is a side elevation of an automobile to which my invention is applied,

Fig. 2, an enlarged side elevation of the coöperative parts by which the rack is fastened to the mud-guard at the front end of the vehicle, Fig. 3, a plan view of the parts shown in Fig. 2, Fig. 4, an enlarged side elevation of one of the devices by which the guard is secured to the running board of the vehicle, Fig. 5, a section on the line 5—5, Fig. 4, Figs. 6 and 7, side elevations of the parts of the fastening devices which are permanently attached to the vehicle, Fig. 8, an enlarged section taken on the line 8—8, Fig. 2, Fig. 9, an enlarged view of one of the anchors which coöperate with the fastening devices attached to the vehicle, to secure the rack, and Fig. 10, a detail view of one of the devices by which the constituent parts of the rack are detachably connected.

The reference numeral 2 designates an automobile of modern construction including a body 3, a running-board 4 and front and rear mud-guards 5 and 6.

My improved rack consists of a net preferably composed of two parallel chains 7 and 8 connected by a number of cross-chains 9. Two or more of the cross-chains are extended for the connection of their opposite ends at the upper edge of the vehicle body and at the outer edge of the running board, and the longitudinal chains which in practice extend in parallel relation to the running board are at their ends connected to the front and rear mud-guards of the vehicle, as shown in Fig. 1 of the drawings.

The parts of the cross-chains extending between the longitudinal chains are detachably connected therewith so that either of the longitudinal chains may be used separate from the other.

The devices for connecting the chains consist of hooks 25 fastened at the ends of the cross-chains for insertion in the links of the lower longitudinal chain, and headed pins 23 which as best shown in Fig. 10 of the drawings, extend through alined links of the cross chains and the upper longitudinal chain and are held in place by pivoted latches 24 at their ends.

The devices by which the rack is attached to the mud-guards and running-board of the automobile consist of folding lugs 10 which are permanently secured to the vehicle, and anchors 12 coöperating with the lugs and attached to the chains of the rack.

The lugs are, as best shown in Figs. 6 and 7, composed of two parts 13 and 14 having a hinge-joint 15 between them.

One of the parts, 13, is apertured for the application of rivets or bolts by means of which it is secured upon the rear surface of the flanges 16 extending along the edges of the mud-guards and the running-board, and the other part, 14, has a slot 17 to receive the flukes 18 of one of the anchors connected with the net of chains.

The slots 17 are placed either lengthwise of the lug as shown in Fig. 6, or cross-wise of the same as illustrated in Fig. 7, in accordance with their location on the vehicle.

A spring-catch 19 at the edge of the fixed member of the lug serves to hold the movable member of the same in a folded position when not in use.

The anchors which coöperate with the lugs in securing the ends of the chains to the vehicle, consist of shanks which may be straight as shown in Figs. 4 and 5, or bent as shown in Fig. 3, and which are apertured at one of their ends for their connection with the chains.

The opposite ends of the shanks have integral cross-pieces to provide the flukes which connect the anchors with the slotted members of the lugs.

The longitudinal chains of the rack are connected with the anchors by which they are attached to the lugs at the front mud-guard of the vehicle, through the intermediary of eye-bolts 20 which are attached at the ends of the chains and extend loosely through the apertures of the respective anchors, and wing-nuts 21 which are screwed upon the protruding ends of the bolts.

One of the chains connected with the bolts, as well as part of the cross-chains which are attached at the edge to the vehicle body, are doubled by the use of hooks 22 which are attached at their extreme ends and inserted in one of their links as best shown in Fig. 2.

The doubled end of the longitudinal chain passes loosely through the eyes of the respective tightening bolt and those of the cross-chains are looped over suitable projections at the upper edge of the vehicle body.

It will be readily understood from the above description that my improved rack is readily applied to or removed from the vehicle, that it is capable of expansion and contraction to vary the capacity of the receptacle produced by its use and that it is readily tightened to securely hold the articles placed upon the running-board of the vehicle, by adjustment of the nuts on the bolts 20.

The lugs which are attached at the flanges of the running-board and mud-guards are folded when not in use and by bunching the chains after the rack is detached from the lug, the entire appliance may be stored in a very small and compact space.

In case the rack is used to hold only articles of large proportions, the lower longitudinal chain and the cross-chains which connect it with the upper chain may be detached and the upper longitudinal chain and upper cross-chains used separately to embrace the upper portion of an article or articles placed upon the running board of the vehicle.

It will be seen that under these conditions, the lower part of the article or articles may extend outwardly from the vehicle as much as is necessary and more than would be possible if the lower portion of the rack remained in place.

When the rack is used to carry articles of small dimensions or to protect a dog seated on the running board, the upper longitudinal chain and the cross chains are detached from the lower chain which together with the lower portions of the cross chain fastened to the running board is sufficient for the purpose.

Having thus described my invention what I claim and desire to secure by Letters-Patent is:

1. A luggage-rack for automobiles comprising a net of chains, and devices to secure the ends thereof, consisting of folding lugs adapted to be fastened at the edges of the running boards or mud-guards of an automobile and having slots in their movable parts, and anchors on the chains coöperating with the slotted parts of the lugs.

2. A luggage-rack for automobiles comprising a net of chains, devices to secure the ends thereof at the edges of the body, running board and mud-guards of an automobile, and tightening bolts interposed between some of said devices and the corresponding chains.

3. A luggage rack for automobiles comprising a net of chains, hooks on the chains coöperating with their links to effect a doubling of their end-portions and devices for fastening the chains at the edges of the body, running board or mud-guards of an automobile, including anchors which are apertured for the passage of the doubled portions of the chains.

4. The combination with the body, running board and mud-guards of an automobile, of a rack composed of a net of chains the ends of which are fastened at determinate points thereof, and tightening bolts for the adjustment of the net.

5. A luggage-rack for automobiles comprising slotted lugs having means for fastening them at the edges of the running board and mud-guards of an automobile, a net of chains, and anchors on the chains coöperating with the slotted lugs to detachably fasten the chains thereto.

In testimony whereof I have affixed my signature.

JOHN W. BEMENT.